US009927888B2

(12) United States Patent
Midorikawa et al.

(10) Patent No.: US 9,927,888 B2
(45) Date of Patent: Mar. 27, 2018

(54) ELECTRONIC DEVICE AND METHOD

(71) Applicant: KABUSHIKI KAISHA TOSHIBA, Minato-ku, Tokyo (JP)

(72) Inventors: Makoto Midorikawa, Hamura Tokyo (JP); Kazuhiko Tsuji, Hamura Tokyo (JP)

(73) Assignee: KABUSHIKI KAISHA TOSHIBA, Minato-ku, Tokyo ( * ) Notice: Subject to any disclaimer, the term of this patent is extended or adjusted under 35 U.S.C. 154(b) by 173 days.

(21) Appl. No.: 14/845,710

(22) Filed: Sep. 4, 2015

(65) Prior Publication Data
US 2016/0179215 A1 Jun. 23, 2016

Related U.S. Application Data

(60) Provisional application No. 62/093,049, filed on Dec. 17, 2014.

(51) Int. Cl.
*G06F 3/038* (2013.01)
*G06F 3/0354* (2013.01)
*G06F 1/32* (2006.01)

(52) U.S. Cl.
CPC ............ *G06F 3/038* (2013.01); *G06F 1/3215* (2013.01); *G06F 1/3218* (2013.01); *G06F 1/3231* (2013.01); *G06F 1/3259* (2013.01); *G06F 1/3265* (2013.01); *G06F 1/3287* (2013.01); *G06F 3/03547* (2013.01); *Y02B 60/1242* (2013.01); *Y02B 60/1253* (2013.01); *Y02B 60/1282* (2013.01); *Y02B 60/1289* (2013.01)

(58) Field of Classification Search
CPC .. G06F 3/03547; G06F 1/3231; G06F 1/3234; G06F 1/3259; G06F 1/3265; G06F 1/3287; G09G 2330/021; G09G 2360/08
USPC ..... 345/157, 173, 679.1, 522; 713/300, 310, 713/320, 324
See application file for complete search history.

(56) References Cited

U.S. PATENT DOCUMENTS

| 2003/0137497 | A1* | 7/2003 | Kojo | G06F 1/1616 345/173 |
| 2005/0052425 | A1* | 3/2005 | Zadesky | G06F 3/0338 345/173 |
| 2010/0164887 | A1* | 7/2010 | Nakamura | G06F 3/03547 345/173 |

FOREIGN PATENT DOCUMENTS

| JP | 2011-159123 | 8/2011 |
| JP | 2012-078946 | 4/2012 |

* cited by examiner

*Primary Examiner* — Koosha Sharifi-Tafreshi
(74) *Attorney, Agent, or Firm* — Knobbe, Martens, Olson & Bear, LLP

(57) ABSTRACT

According to one embodiment, an electronic device provided with a touchpad includes a switching controller, a display processor, a notification processor and a notification controller. The notification controller is configured to control the notification processor to prevent a notification processing from being executed, even if an operation is performed on the touchpad, when the switching controller switches from a state of enabling an operation on the touchpad to a state of disabling an operation on the touchpad.

7 Claims, 3 Drawing Sheets

| Whether LCD backlight is On or Off | Whether key input operation is performed or not | Whether to stop or resume touch input notification processing |
|---|---|---|
| On | Performed | Stop |
| | Not performed | Resume |
| Off | Performed | Resume |
| | Not performed | Resume |

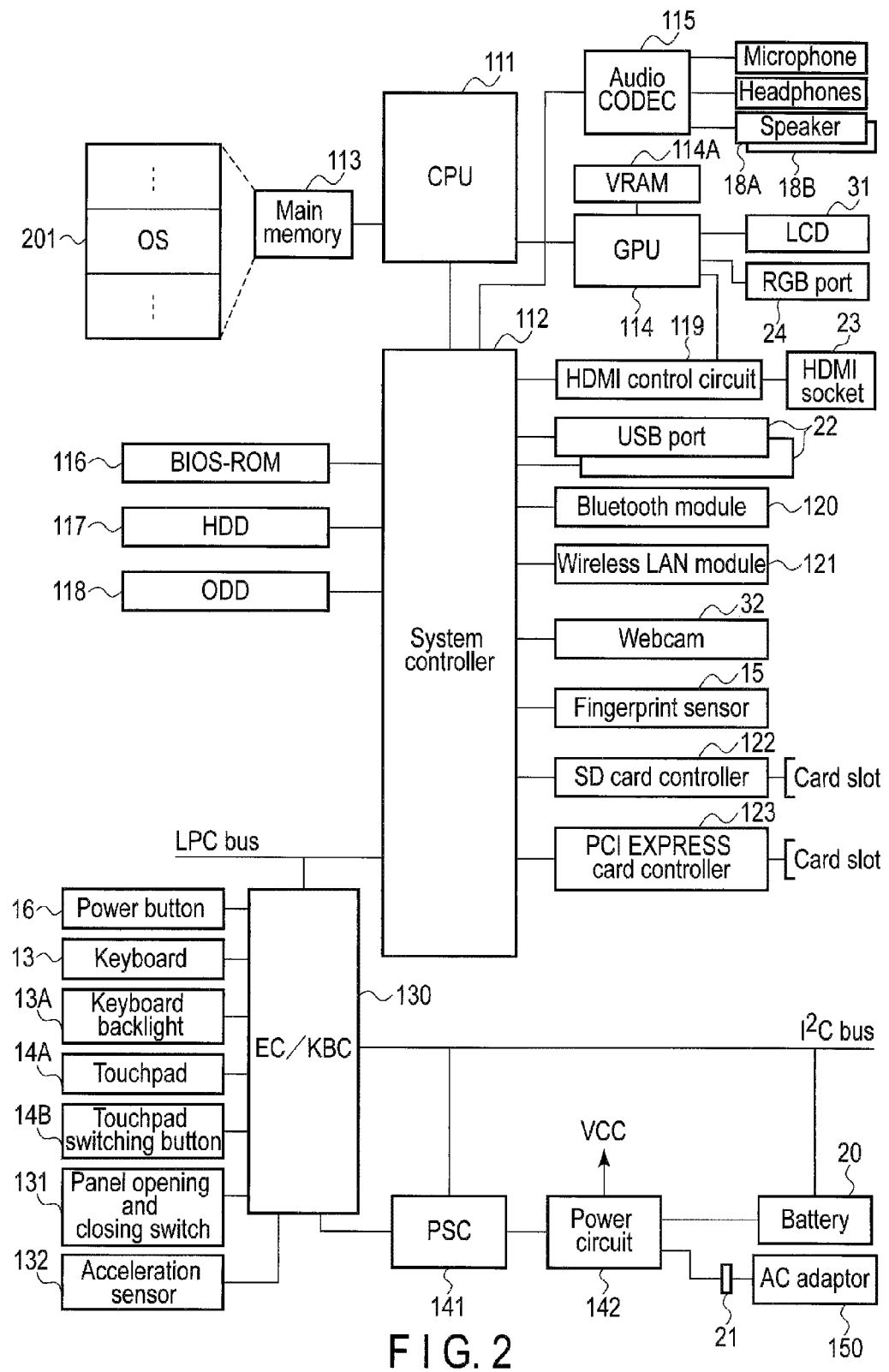
F I G. 2

ELECTRONIC DEVICE AND METHOD

CROSS-REFERENCE TO RELATED APPLICATIONS

This application claims the benefit of U.S. Provisional Application No. 62/093,049, filed Dec. 17, 2014, the entire contents of which are incorporated herein by reference.

FIELD

Embodiments described herein relate generally to an electronic device and a method.

BACKGROUND

Personal computers (PCs) provided with a touchpad generally implement a function to disable the touchpad to prevent the touchpad from interfering with key input operation. When the touchpad is disabled by this function, a mouse pointer (mouse cursor) will not be displayed or moved on the screen even if an operation is performed on the touchpad.

However, even when the touchpad is disabled by the above-described function, predetermined processing occurs in the CPU of the PC if an operation is performed on the touchpad. More specifically, even though the touchpad is disabled, an operation on the touchpad is unnecessarily notified to the CPU in a manner similar to that of the case of displaying the mouse pointer, and thus unnecessary processing to discard this notification occurs in the CPU. Therefore, even when the touchpad is disabled, the above-described unnecessary processing occurs in the CPU of the PC if the user mistakenly touches the touchpad, and this leads to a problem of increase in power consumption.

Therefore, there are demands for a new technique to overcome the above-described problem.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a block diagram showing the system configuration of an electronic device of an embodiment.

DETAILED DESCRIPTION

Various embodiments will be described hereinafter with reference to the accompanying drawings.

In general, according to one embodiment, an electronic device provided with a touchpad includes a switching controller, a display processor, a notification processor and a notification controller. The switching controller is configured to switch between a state of enabling a user's operation on the touchpad and a state of disabling the user's operation on the touchpad. The display processor is configured to execute display processing to display a mouse pointer on a screen. The notification processor is configured to execute notification processing when a user's operation is performed on the touchpad, the notification processing including notifying the display processor of the operation performed on the touchpad so as to execute the display processing. The notification controller is configured to control the notification processor to prevent the notification processing from being executed, even if an operation is performed on the touchpad, when the switching controller switches from the state of enabling an operation on the touchpad to the state of disabling an operation on the touchpad.

Firstly, the structure of the electronic device of an embodiment will be described with reference to FIG. 1. The electronic device can be realized as, for example, a notebook portable personal computer or various other electronic devices provided with a touchpad. The following descriptions are based on the assumption that the electronic device is realized as a notebook portable personal computer 10.

Figures 1, 4:
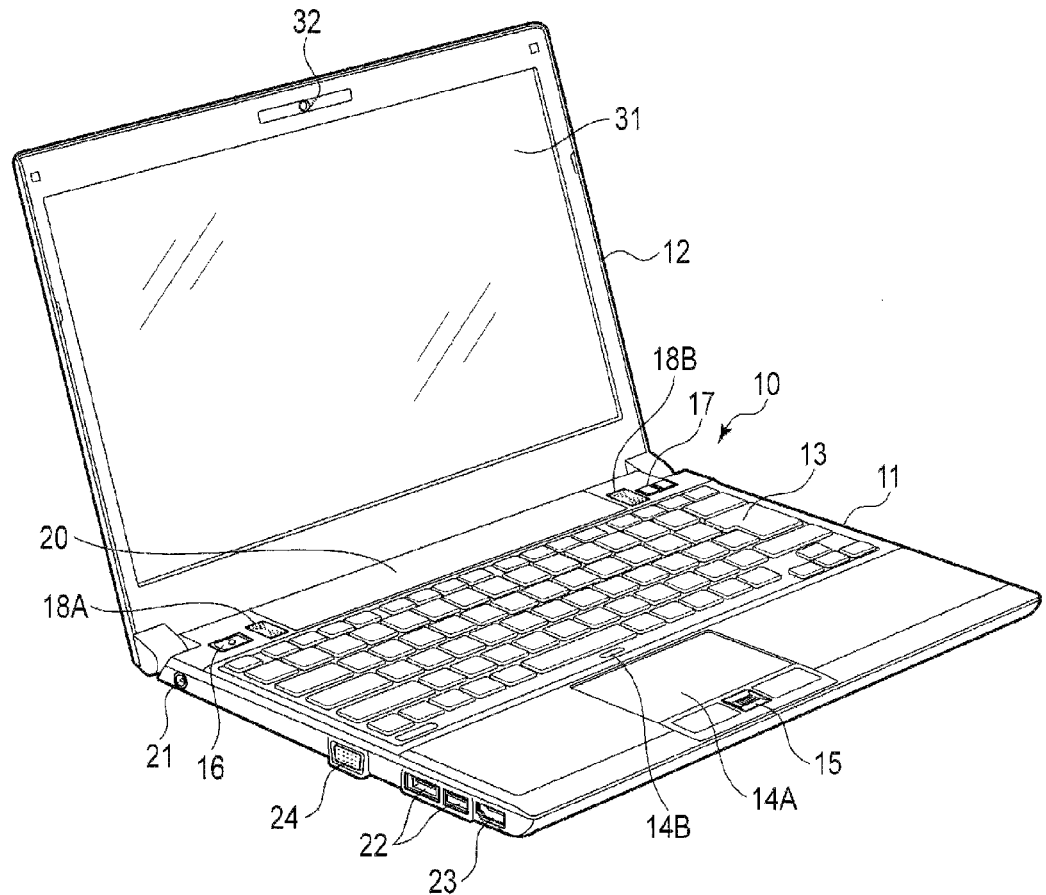
FIG. 1 is a perspective view of an example of the exterior appearance of an electronic device of an embodiment.
FIG. 4 is a table for explaining a monitoring function in an electronic device of an embodiment.

FIG. 1 is a front perspective view of the computer 10 in a state in which a display unit is opened.

The computer 10 is configured to receive power from a battery 20. The computer 10 includes a computer body 11 and a display unit 12. The display unit 12 includes a built-in display unit including a liquid crystal display (LCD) 31. Further, at the upper end of the display unit 12, a camera (webcam) 32 is provided.

The display unit 12 is provided rotatable between an open position in which the upper surface of the computer body 11 is exposed and a closed position in which the upper surface of the computer body 11 is covered with the display unit 12. The computer body 11 includes a thin box-shaped housing, and on the upper surface thereof, a keyboard 13, a touchpad 14A, a touchpad switching button 14B, a fingerprint sensor 15, a power button 16 to power the computer 10 on and off, several functional buttons 17, and speakers 18A and 18B are provided.

Further, the computer body 11 is provided with a power connector 21. The power connector 21 is provided on the side surface, for example, on the left side surface of the computer body 11. To the power connector 21, an external power device is detachably connected. It is possible to use an AC adaptor as the external power device. The AC adaptor is a power device configured to convert commercial power (AC power) to DC power.

The battery 20 is provided, for example, in the rear-end portion of the computer body 11 in a removable manner. The battery 20 may be a battery incorporated into the computer 10.

The computer 10 is driven by power supplied from an external power device or power supplied from the battery 20. When an external power device is connected to the power connector 21 of the computer 10, the computer 10 is driven by power supplied from the external power device. Further, the power supplied from an external power device is also used for charging the batter 20. When the external power device is not connected to the power connector 21 of the computer 10, the computer 10 is driven by power supplied from the battery 20.

Further, the computer body 11 is provided with several USB ports 22, a High-definition Multimedia Interface (HDMI) output terminal 23, and an RGB port 24.

FIG. 2 illustrates the system configuration of the computer 10. The computer 10 includes a CPU 111, a system controller 112, a main memory 113, a graphics processing unit (GPU) 114, an audio codec 115, a BIOS-ROM 116, a hard disk drive (HDD) 117, an optical disk drive (ODD) 118, a Bluetooth (registered trademark) module 120, a wireless LAN module 121, an SD card controller 122, a PCI EXPRESS card controller 123, an embedded controller/keyboard controller IC (EC/KBC) 130, a keyboard backlight 13A, a panel opening and closing switch 131, an acceleration sensor 132, a power-supply controller (PSC) 141, a power circuit 142, and the like.

The CPU 111 is a processor configured to control the operation of each component of the computer 10. The CPU 111 executes various kinds of software loaded from the HDD 117 into the main memory 113. The software includes an operating system (OS) 201 and various application programs.

Further, the CPU 111 executes a basic input/output system (BIOS) stored in a non-volatile memory, namely, the BIOS-ROM 116. The BIOS is a system program for hardware control.

The GPU 114 is a display controller configured to control the LCD 31 used as a display monitor of the computer 10. Note that the GPU 114 may be incorporated into the CPU 111. The GPU 114 generates a display signal (LVDS signal) to be supplied to the LCD 31 from display data stored in a video memory (VRAM) 114A. Further, the GPU 114 can also generate an analog RGB signal and an HDMI video signal from display data. The analog RGB signal is supplied to an external display via the RGB port 24. The HDMI output terminal 23 can transmit an HDMI video signal (uncompressed digital video signal) and a digital audio signal to an external display by a single cable. An HDMI control circuit 119 is an interface for transmitting an HDMI video signal and a digital audio signal to an external display via the HDMI output terminal 23.

The system controller 112 is a bridge device configured to connect the CPU 111 and each component with each other. The system controller 112 includes a built-in serial ATA controller to control the hard disk drive (HDD) 117 and the optical disk drive (ODD) 118. Further, the system controller 112 executes communication with each device on a low pin count (LPC) bus.

The EC/KBC 130 is connected to the LPC bus. The EC/KBC 130, the power-supply controller (PSC) 141 and the battery 20 are interconnected with each other via a serial bus such as an I²C bus.

The EC/KBC 130 is a power management controller to perform power management of the computer 10 and realized as, for example, a single-chip microcomputer including a built-in keyboard controller configured to control the keyboard (KB) 13, the touchpad 14A and the like. The EC/KBC 130 includes a function of powering on and powering off the computer 10 based on the user's operation on the power button 16. The EC/KBC 130 cooperates with the power-supply controller (PCS) 141 in performing the control to power on and power off the computer 10. When receiving an ON signal transmitted from the EC/KBC 130, the power-supply controller (PSC) 141 controls the power circuit 142 to power on the computer 10. Further, when receiving an OFF signal transmitted from the EC/KBC 130, the power-supply controller (PSC) 141 controls the power circuit 142 to power off the computer 10. The EC/KBC 130, the power-supply controller (PSC) 141 and the power circuit 142 operate on power supplied from the battery 20 or from the AC adaptor 150 even while the computer 10 is off.

Further, the EC/KBC 130 can turn the keyboard backlight 13A on the rear of the keyboard 13 on and off. Still further, the EC/KBC 130 is connected to the panel opening and closing switch 131 configured to detect the opening and closing of the display unit 12. When the panel opening and closing switch 131 detects that the display unit 12 opened, the EC/KBC 130 can power on the computer 10.

The power circuit 142 generates power (operation power) to be supplied to each component by using power supplied from the battery 20 and power supplied from the AC adaptor 150 connected to the computer body 11 as an external power device. Note that the system power supplied by the power circuit 142 may appropriately be supplied to a USB device connected to the computer 10 via the USB port 22.

Here, the touchpad control function in the EC/KBC 130 provided in the computer 10 of the present embodiment will be described.

The EC/KBC 130 includes a function of switching between a setting for enabling an operation on the touchpad 14A and a setting for disabling an operation on the touchpad 14A based on the user's operation of the touchpad switching button 14B. Note that, although the present embodiment describes a case in which the computer 10 is provided with the touchpad switching button 14B directly connected to the EC/KBC 130 by a signal line, the computer 10 may not be provided with the touchpad switching button 14B. In that case, the switching between the setting for enabling an operation on the touchpad 14A and the setting for disabling an operation on the touchpad 14A is executed by an application stored in the main memory 113, and based on a notification from the application, it is determined whether the touchpad 14A is enabled or disabled. If it is possible to determine whether the touchpad 14A is enabled or disabled, the EC/KBC 130 can execute various kinds of processing by the touchpad control function and a monitoring function, which will be described later. Note that it is still possible to use a mouse connected to the USB port 22 even while an operation on the touchpad 14A is disabled.

The touchpad control function stops touch input notification processing, and is enabled when, for example, the setting of the touchpad 14A is switched from an enabled mode to a disabled mode. The touch input notification processing notifies the CPU 111 that the touchpad 14A has been touched by the user. Note that a case in which the touchpad control function is enabled when the setting of the touchpad 14A is switched from the enabled mode to the disabled mode is described by way of example only, and thus the touchpad control function is not restrictedly enabled at the above-described time. The time at which to enable the touchpad control function will be described later with reference to FIG. 3.

When the touchpad 14A is set to the enabled mode, the CPU 111 displays a mouse pointer (mouse cursor) on the screen based on information notified from the EC/KBC 130 by the touch input notification processing and executes processing to move the mouse cursor. Further, generally, the above-described touch input notification processing is executed even when the touchpad 14A is set to the disabled mode, and therefore the CPU 111 executes unnecessary processing to discard unnecessary information notified from the EC/KBC 130. This unnecessary processing consumes approximately 1 watt of power, which causes a problem of increase in power consumption.

According to the above-described touchpad control function, regardless of whether the touchpad 14A is set to the enabled mode or the disabled mode, it becomes possible to stop the touch input notification processing, which is conventionally configured to be executed at any time, at a predetermined time. In this way, it is possible to reduce unnecessary processing in the CPU 111 caused by the execution of the touch input notification processing unnecessarily. That is, it is possible to prevent increase in power consumption.

Note that the EC/KBC 130 further includes the monitoring function in addition to the above-described touchpad control function to enhance the convenience of the touchpad control function. The monitoring function will be described below.

The monitoring function monitors the state of the computer 10 and determines whether to enable or disable the touchpad control function when the touchpad 14A is set to the disabled mode. More specifically, the EC/KBC 130 monitors the state of the computer 10 by determining whether the backlight of the LCD is on or off and whether an key input operation is performed or not. Note that described in the present embodiment is a case in which the state of the computer 10 is monitored by determining whether the backlight of the LCD is on or off and whether an key input operation is performed or not, but it is also possible to perform the monitoring by further determining whether an input from a USB mouse is present or not. In this case, the EC/KBC 130 is not directly connected to the USB port 22. Thus, the presence of the input from the mouse is monitored by receiving a signal indicating the presence of the input from the mouse from the system controller 112.

Figure 3:
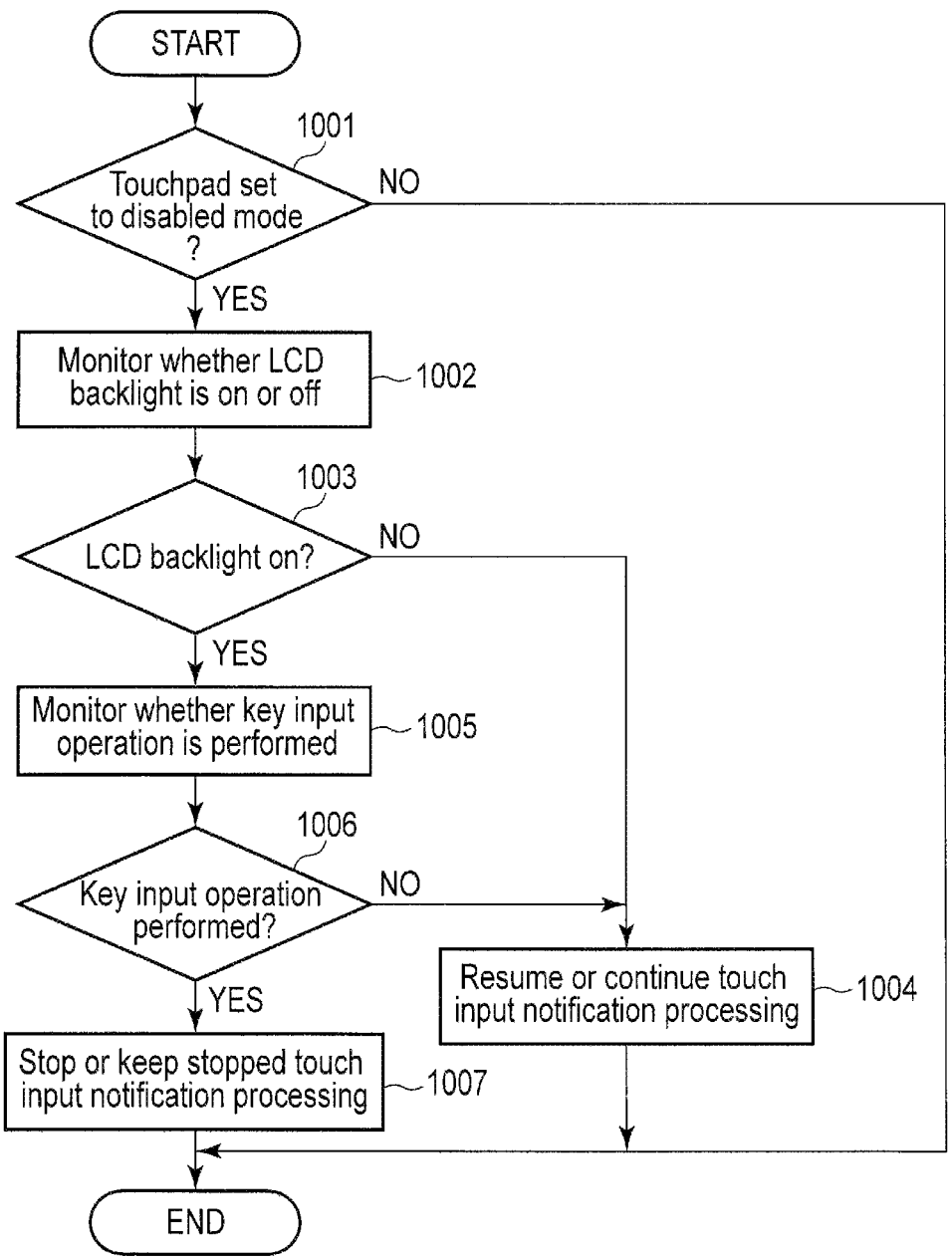
FIG. 3 is a flowchart showing an example of the processing of a monitoring function in an electronic device of an embodiment.

Here, processing by the above-described monitoring function will be described with reference to the flowchart of FIG. 3.

Firstly, it is determined whether the EC/KBC 130 is set to the disabled mode or not (block 1001). Note that the sequence of processing ends here if the touchpad 14A is not set to the disabled mode, that is, if the touchpad 14A is set to the enabled mode (No in block 1001).

If the touchpad 14A is determined to be set to the disabled mode (Yes in block 1001), on the other hand, the EC/KBC 130 monitors whether the backlight of the LCD is on or off. More specifically, in order to monitor whether the backlight of the LCD is on or off, the EC/KBC 130 obtains from the system controller 112 an LCD status signal indicating the status of the LCD (block 1002). Note that the off state of the backlight of the LCD is not a state in which the brightness of the backlight of the LCD is set to be lower than that of the on state but a state in which the backlight of the LCD is completely turned off. That is, the screen is completely blank.

The EC/KBC 130 then determines based on the LCD status signal obtained by the processing in block 1002 whether the backlight of the LCD is on (block 1003). When the backlight of the LCD is determined not to have been on, that is, when the backlight of the LCD is determined to have been off (No in block 1003) and if the touch input control function has been enabled and the touch input notification processing has been stopped, the EC/KBC 130 keeps the setting of the touchpad 14A in the disabled mode and temporarily disables the touchpad control function (in other words, restores a state in which the touch input notification processing is executable) in consideration of a case in which the user operates the touchpad 14A to switch the backlight of the LCD from off to on, and ends the sequence of processing. Further, if the touchpad control function has been disabled and the touch input notification processing has not been stopped, the EC/KBC 130 keeps the touchpad control function disabled (in other words, maintains a state in which the touch input notification processing is executable) (block 1004), and ends the sequence of processing.

On the other hand, if the backlight of the LCD is determined to have been on (Yes in block 1003), the EC/KBC 103 monitors whether a key input operation has been performed or not. More specifically, in order to monitor whether a key input operation has been performed or not, the EC/KBC 130 obtains the time elapsed from the preceding key input operation until the present time from a timer not shown in the drawing (block 1005).

The EC/KBC 130 then determines whether key input has been received or not based on whether the elapsed time obtained by the processing in block 1005 is longer than a preset threshold value (block 1006). When key input is determined not to have been received, that is, when a key input operation is determined not to have been performed (No in block 1006) and if the touchpad control function has been enabled and the touch input notification processing has been stopped, the EC/KBC 130 keeps the setting of the touchpad 14A disabled and temporarily disables the touchpad control function (in other words, restores the state in which the touch input notification processing is executable) in consideration of a case in which the user operates the touchpad 14A to restore to a normal state from a state in which the brightness of the backlight of the LCD has been set to be lower than that of the on state or from a state in which the screen-saver has been activated, and ends the sequence of processing. Further, if the touchpad control function has been disabled and the touch input notification processing has not been stopped, the EC/KBC 130 keeps the touchpad control function disabled (in other words, maintains a state in which the touch input notification is executable) (block 1004), and ends the sequence of processing.

On the other hand, when key input is determined to have been received, that is, when a key input operation is determined to have been performed (Yes in block 1006) and if the touchpad control function has been enabled and the touch input notification processing has been stopped, the EC/KBC 130 keeps the touchpad control function enabled and ends the sequence of processing. Further, if the touchpad control function has been disabled and the touch input notification processing has not been stopped, the EC/KBC 130 enables the touchpad control function in consideration of a case in which the user mistakenly or unintentionally touches the touchpad 14A while performing a key input operation (block 1007), and ends the sequence of processing.

FIG. 4 is a table for explaining the monitoring function in the computer 10. As described above and also shown in FIG. 4, when the touchpad 14A is set to the disabled mode and if it is determined from the monitoring result obtained by the above-described monitoring function that the backlight of the LCD has been on and a key input operation has been performed, the EC/KBC 130 enables (or keeps enabled) the touchpad control function and stops the touch input notification processing. On the other hand, as shown in FIG. 4, when the touchpad 14A is set to be the disabled mode and if it is determined from the monitoring result obtained by the above-described monitoring function that the backlight of the LCD has been on and no key input operation has been performed for a certain time from the preceding key input operation, the EC/KBC 130 disables (or keeps disabled) the touchpad control function and resumes the touch input notification processing. Further, as shown in FIG. 4, when the touchpad 14A is set to be the disabled mode and if it is determined from the monitoring result obtained by the above-described monitoring function that the backlight of the LCD has been off, the EC/KBC 130 disables (or keeps disabled) the touchpad control function regardless of whether a key input operation has been performed or not, and resumes the touch input notification processing.

According to one embodiment described above, the computer 10 includes the EC/KBC 130 configured not to execute the touch input notification processing even if an operation is performed on the touchpad 14A when the touchpad 14 is set to the disabled mode. Therefore, even if the user mistakenly or unintentionally touches the touchpad 14A when the touchpad 14A is set to the disabled mode, the operation on the touchpad 14A is not notified to the CPU 111, and thus unnecessary processing to discard an unnecessary notification is not executed in the CPU 111. That is, it is possible to prevent unnecessary power consumption in the processing which has conventionally occurred in the CPU 111.

Further, since the EC/KBC 130 includes a function of monitoring the state of the computer 10 and determining whether to enable or disable the touchpad control function, it is possible to achieve an improvement in the convenience of the touchpad control function as well as the above-described prevention of unnecessary power consumption.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
    a touchpad;
    a keyboard;
    a display;
    a controller configured to control the touchpad and the keyboard; and
    a processor configured to display a mouse cursor on a screen of the display using information notified from the controller,
    wherein the controller is configured to:
        determine whether the touchpad is in an enabled mode or a disabled mode based on a switch operation by a user using a button or a switch operation using an application,
        stop touch input notification processing that notifies information to the processor according to an operation of the touchpad when the touchpad is switched from the enabled mode to the disabled mode,
        monitor a state of the electronic device when the touchpad is in the disabled mode to determine whether a backlight of the display is on or off and whether a key input operation is performed or not, and
        determine whether to resume or continue stopping the touch input notification processing, and to resume the touch input notification processing from a stopped state to an executable state when the touch input notification processing has been stopped and the backlight is off.

2. The electronic device of claim 1, wherein the controller is configured to continuously stop the touch input notification processing when the backlight is on and the key input operation is being performed.

3. The electronic device of claim 2, wherein the controller is configured to monitor whether or not the key input operation is being performed based on whether a preset time has elapsed from the key input operation.

4. The electronic device of claim 1, wherein the controller is configured to resume the touch input notification processing from the stopped state to the executable state when the backlight is on and the key input operation is not being performed.

5. The electronic device of claim 1, wherein the controller is further configured to:
    monitor whether an input from a mouse connected to an input port of the electronic device is present or not, and
    continuously stop the touch input notification processing when the backlight is on and the input from the mouse is present.

6. The electronic device of claim 5, wherein the controller is configured to resume the touch input notification processing from a stopped state to an executable state when the backlight is on and the input from the mouse is not present.

7. A method applied to an electronic device including a touchpad, a keyboard, a display, a controller configured to control the touchpad and the keyboard, and a processor configured to display a mouse cursor on a screen of the display using information notified from the controller, the method comprising:
    determining whether the touchpad is in an enabled mode or a disabled mode based on a switch operation by a user using a button or a switch operation using an application;
    stopping touch input notification processing that notifies the information to the processor according to an operation of the touchpad when the touchpad is switched from the enabled mode to the disabled mode;
    monitoring a state of the electronic device when the touchpad is in the disabled mode to determine whether a backlight of the display is on or off and whether a key input operation is performed or not; and
    determining whether to resume or continue stopping the touch input notification processing, and resuming the touch input notification processing from a stopped state to an executable state when the touch input notification processing has been stopped and the backlight is off.

* * * * *